(12) United States Patent
Sugaya et al.

(10) Patent No.: US 7,373,135 B2
(45) Date of Patent: May 13, 2008

(54) COMMUNICATION SYSTEM, COMMUNICATION APPARATUS, COMMUNICATION METHOD, AND PROGRAM

(75) Inventors: Shigeru Sugaya, Kanagawa (JP); Tomonari Yamagata, Kanagawa (JP); Hideki Iwami, Saitama (JP)

(73) Assignee: Sony Corporation (JP)

( * ) Notice: Subject to any disclaimer, the term of this patent is extended or adjusted under 35 U.S.C. 154(b) by 774 days.

(21) Appl. No.: 10/818,512

(22) Filed: Apr. 2, 2004

(65) Prior Publication Data

US 2004/0228311 A1  Nov. 18, 2004

(30) Foreign Application Priority Data

Apr. 18, 2003  (JP) ............................ P2003-114863

(51) Int. Cl.
*H04M 11/00* (2006.01)

(52) U.S. Cl. ................ 455/403; 455/414.1; 455/432.1; 455/461; 370/338; 370/389

(58) Field of Classification Search ............... 370/419, 370/463, 360, 381, 389, 395.7, 395.71, 469; 455/432, 434, 435, 461, 463, 422

See application file for complete search history.

(56) References Cited

U.S. PATENT DOCUMENTS 7,058,071 B1 * 6/2006 Myles et al. ................. 370/419
7,120,131 B2 * 10/2006 Seppala et al. ............. 370/310
7,221,686 B1 * 5/2007 Belcea ........................ 370/509

* cited by examiner

*Primary Examiner*—Tony T. Nguyen
(74) *Attorney, Agent, or Firm*—Lerner, David, Littenberg, Krumholz & Mentlik, LLP

(57) ABSTRACT

A collision of data transmitted in an ad hoc network in which a communication system such as a wireless LAN system is managed without a master control station is minimized. A communication station in the network estimates a time at which a neighboring station will transmit a signal and, when a communication start request is received from some other communication station, adds time information, generated based on the length of time to the estimated time, to a response to the communication start request. This allows the reception side communication station, which knows in advance that the transmission will be occupied by a transmission from other communication stations, to cause the transmission side communication station to transmit data at a time other than that occupation time.

6 Claims, 15 Drawing Sheets

F I G. 3

| TYPE (RTS) | DATA LENGTH | Rx ADDRESS | Tx ADDRESS | BUFFER DATA AMOUNT | COMMUNICATION PERMISSIBLE TIME | CRC |

F I G. 4

| TYPE (CTS) | DATA LENGTH | Rx ADDRESS | Tx ADDRESS | RECEPTION PERMISSIBLE TIME | NEXT USABLE TIME | CRC |

F I G. 7
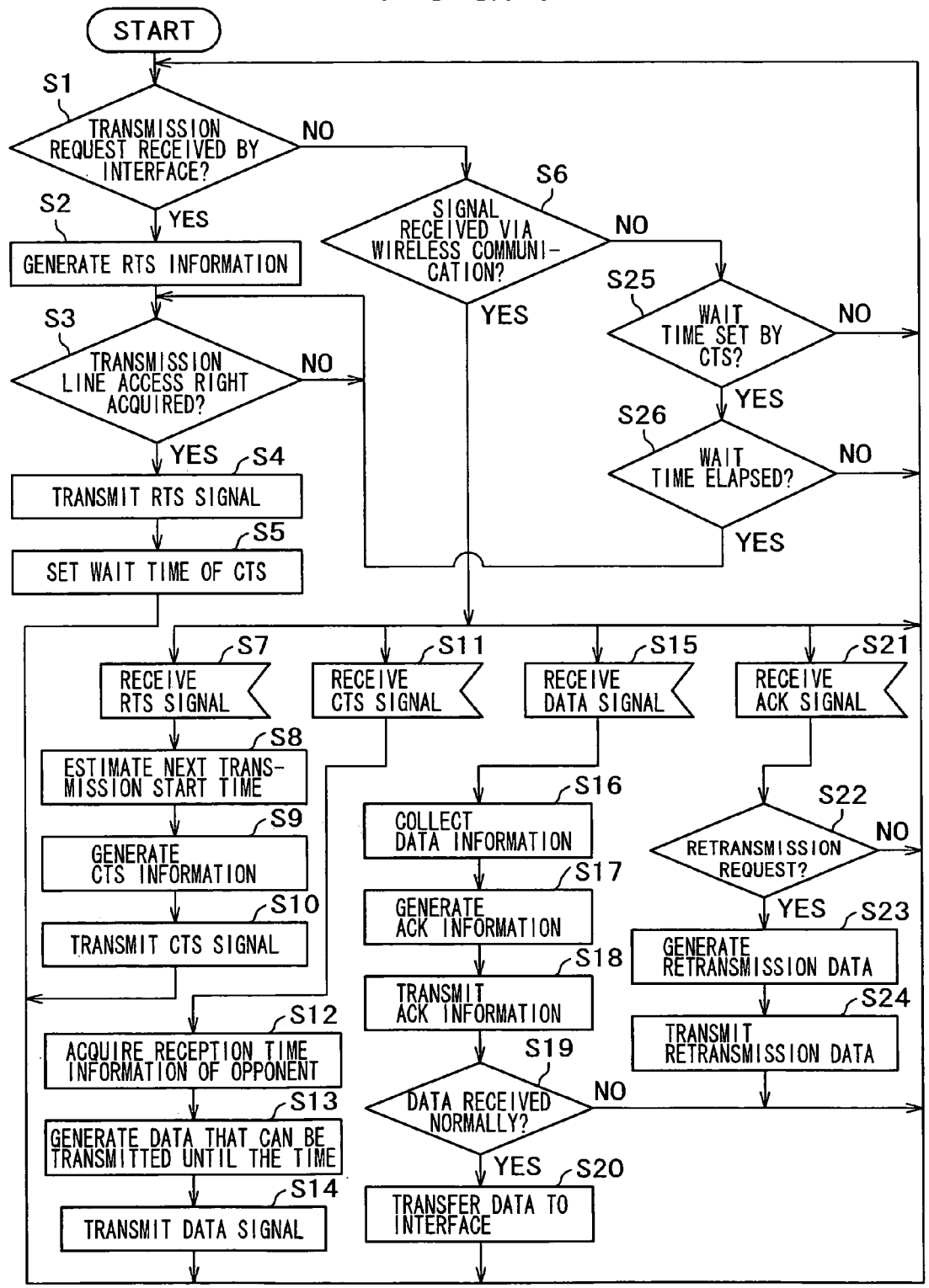

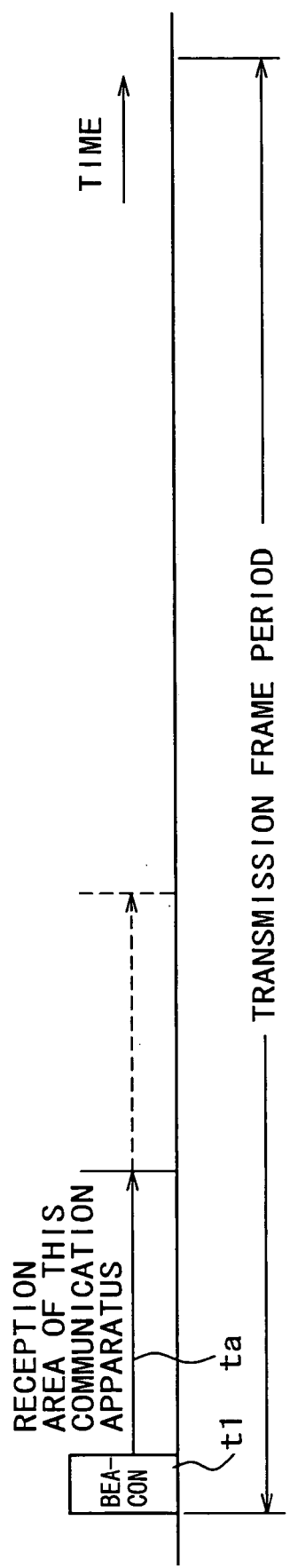

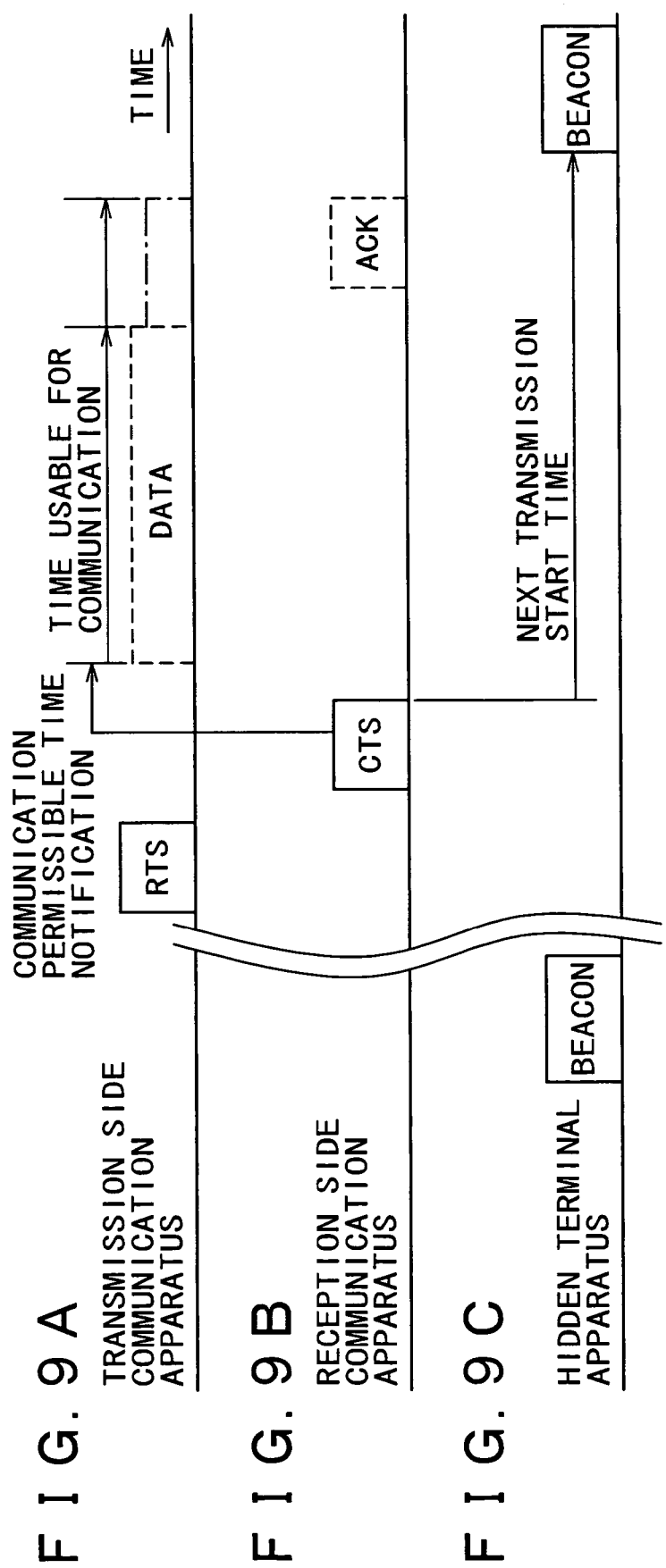

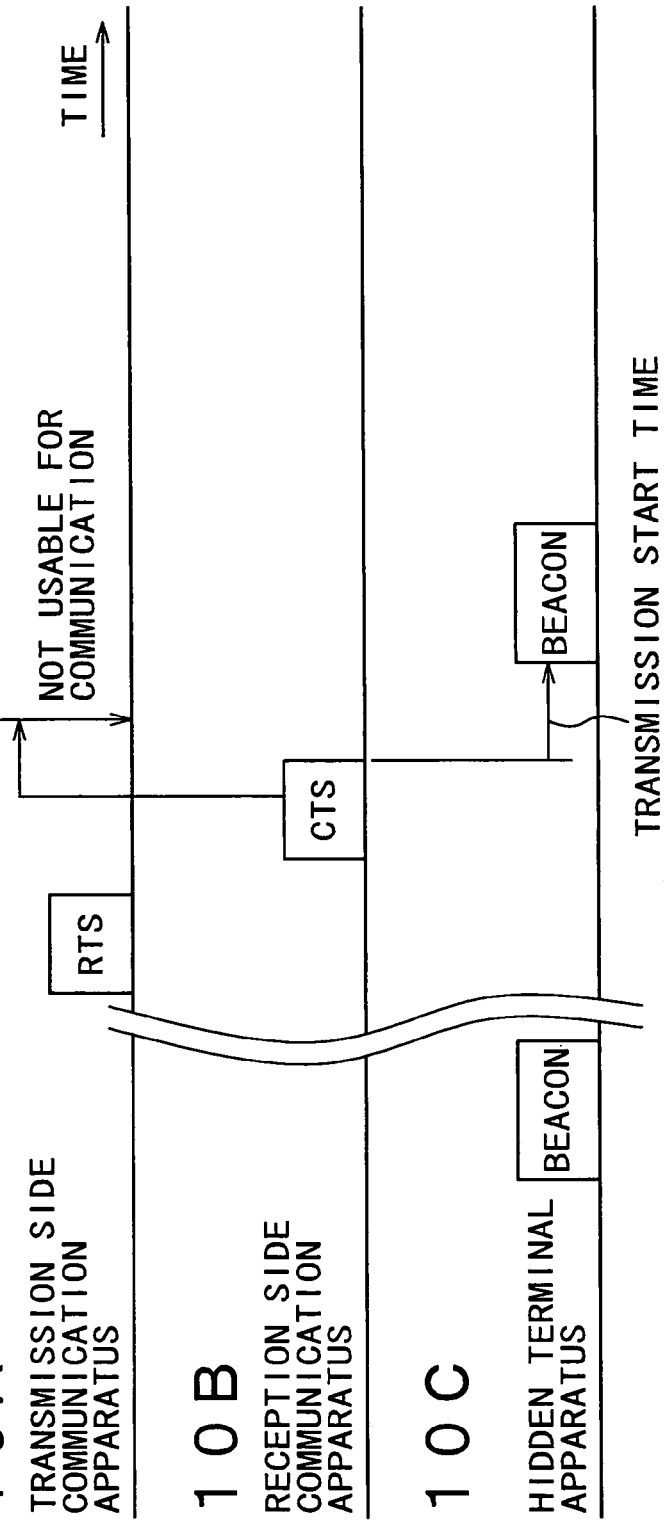

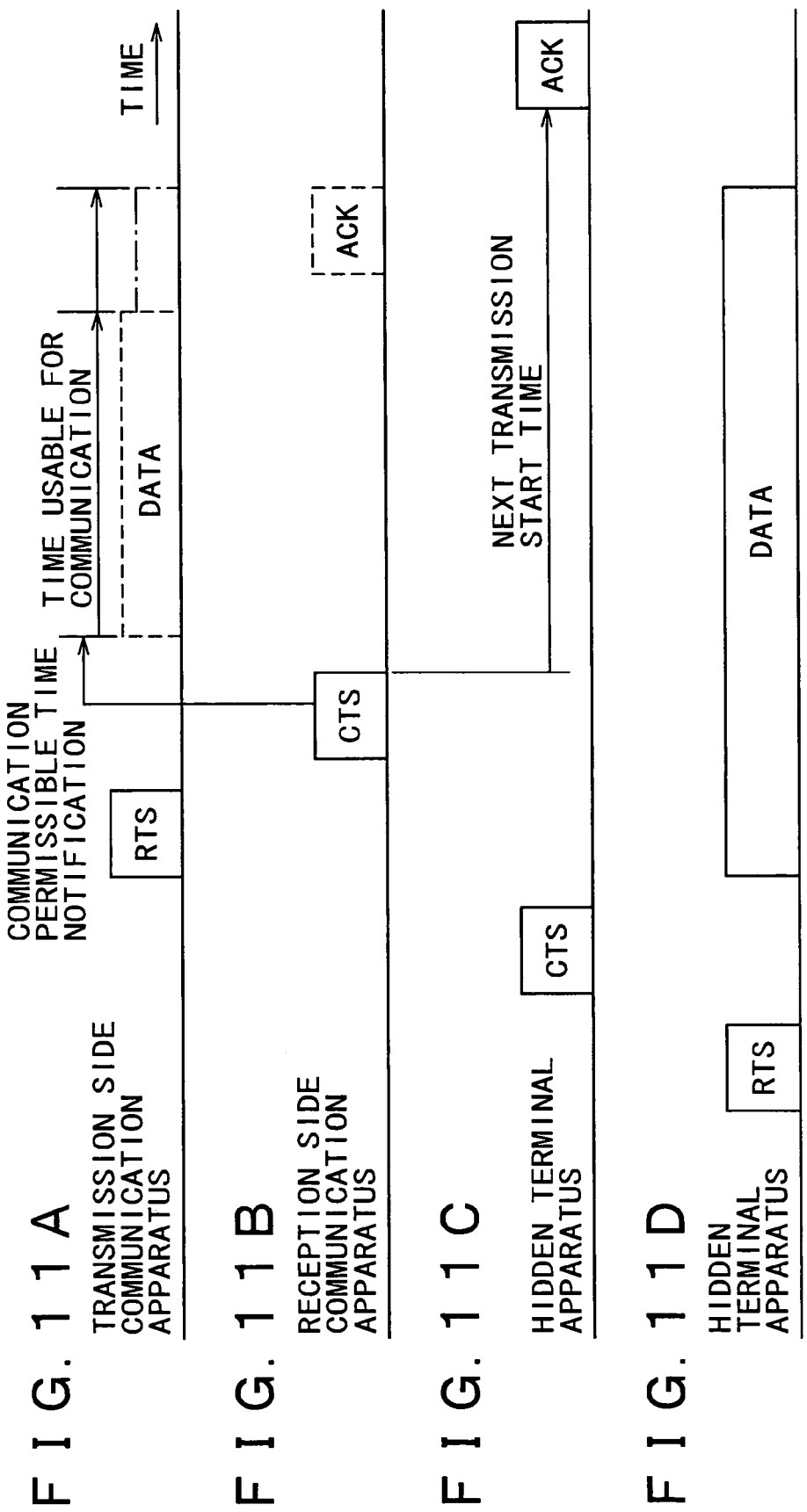

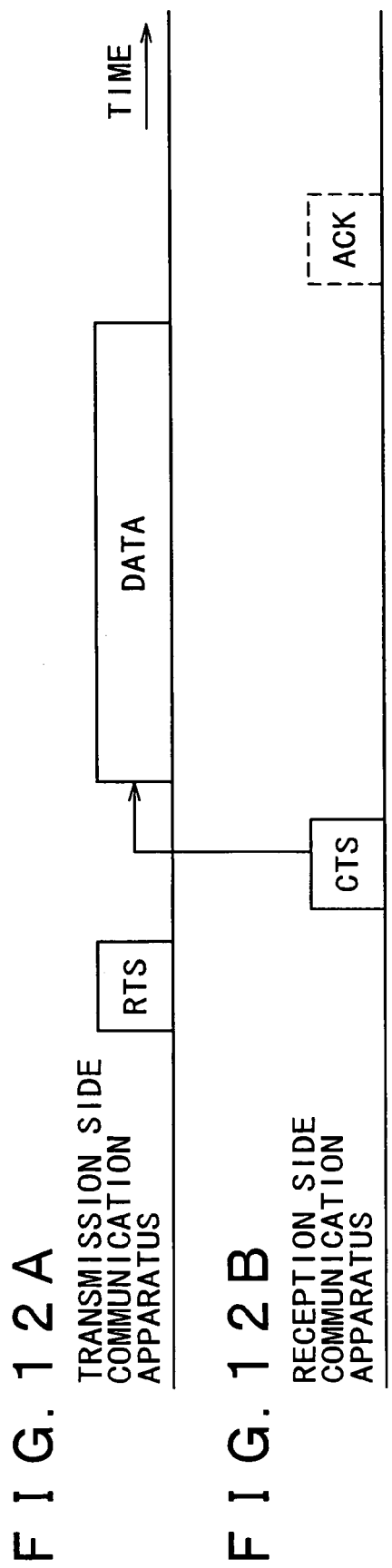

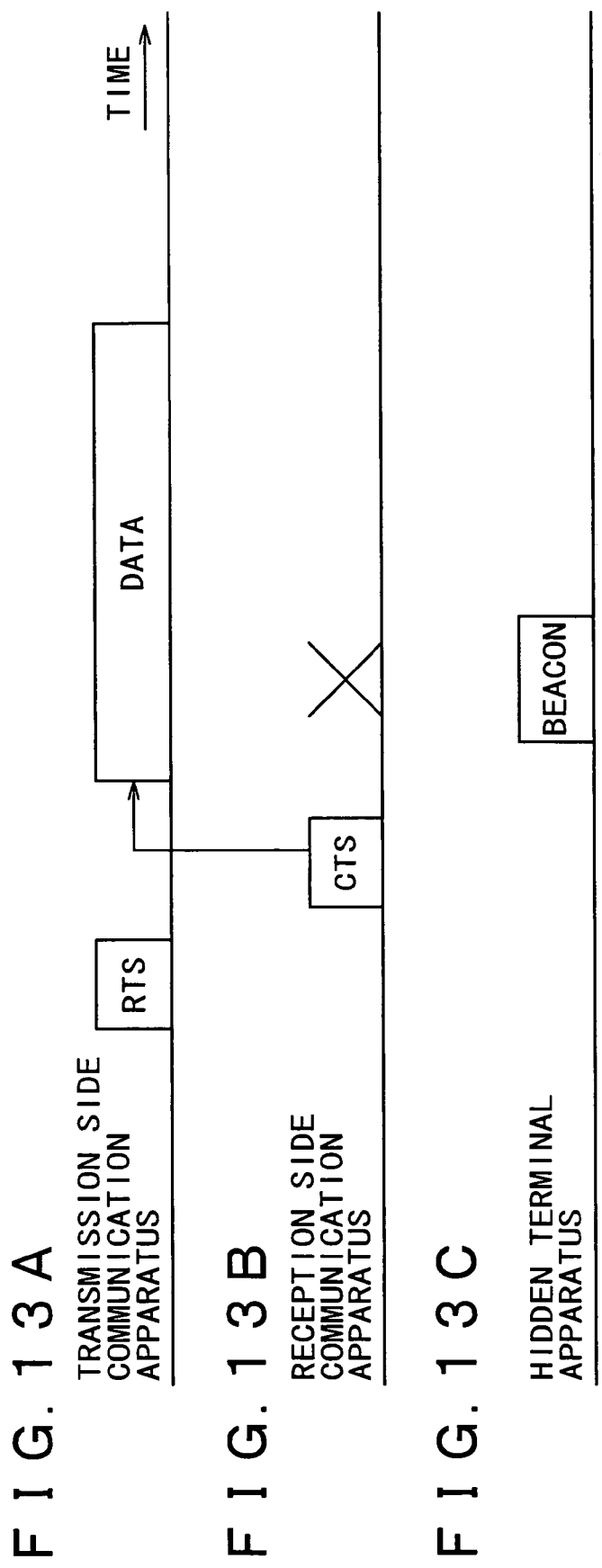

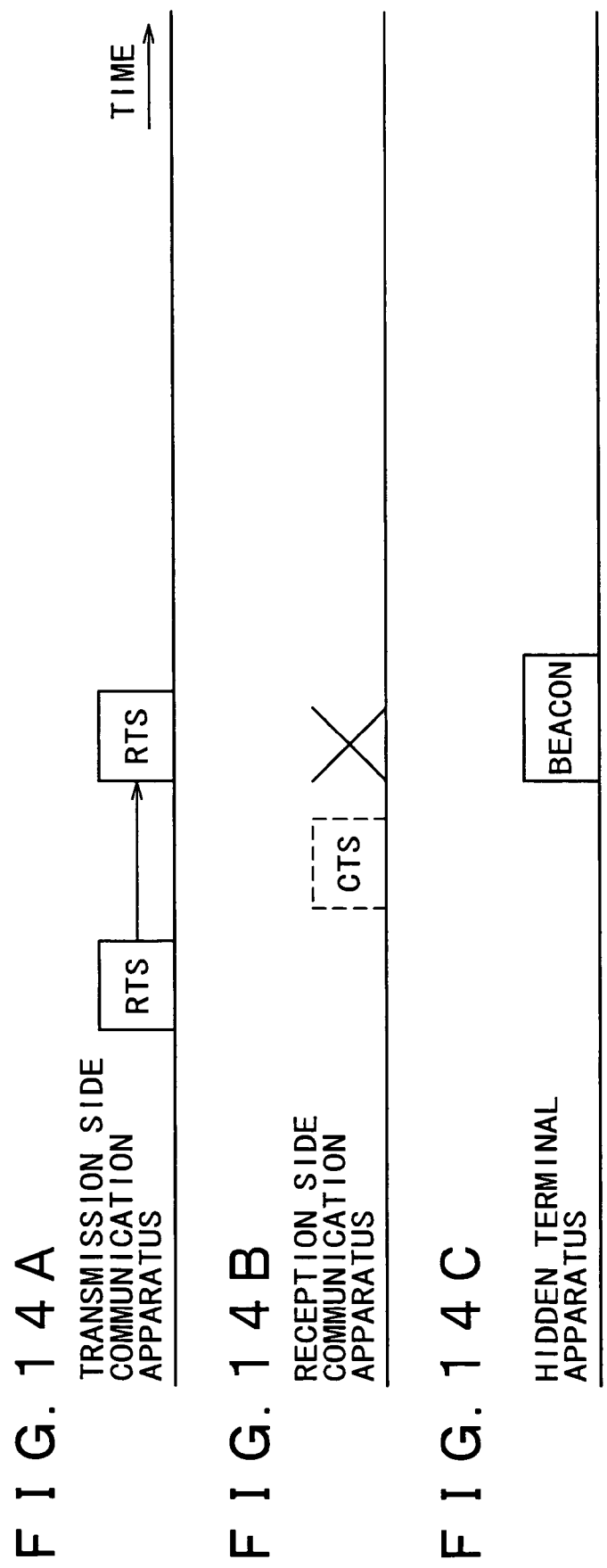

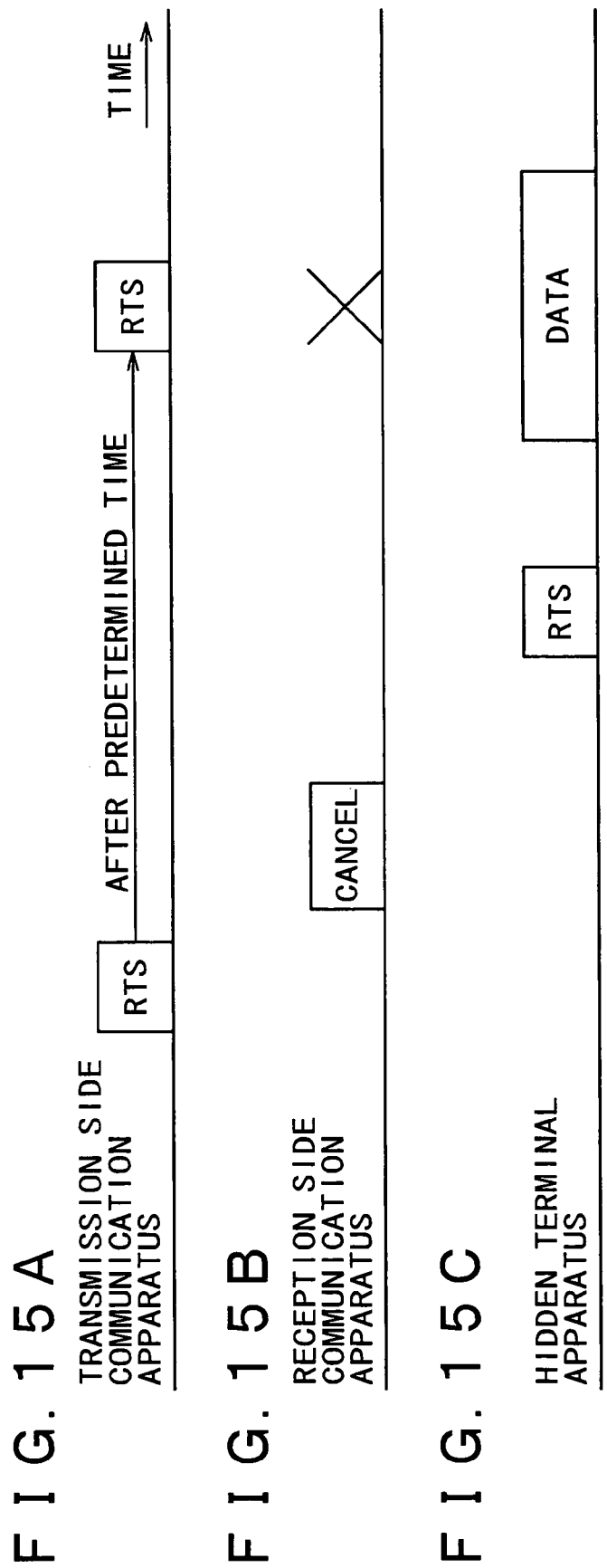

COMMUNICATION SYSTEM, COMMUNICATION APPARATUS, COMMUNICATION METHOD, AND PROGRAM

CROSS REFERENCE TO RELATED APPLICATION

This application claims priority from Japanese Priority Document No. 2003-114863, filed on Apr. 18, 2003 with the Japanese Patent Office, which document is hereby incorporated by reference.

BACKGROUND OF THE INVENTION

1. Field of the Invention

The present invention relates to a communication system, a communication apparatus, a communication method, and a program executing communication processing that is advantageously applicable to a wireless ad hoc network in which a wireless LAN (Local Area Network) system for use in a data communication performs operation without a master control station.

2. Description of Related Art

One of widely known conventional media access control methods used in a wireless LAN system is an access control method defined by the IEEE (The Institute of Electrical and Electronics Engineers) 802.11 standard. The IEEE 802.11 standard is described in detail in International Standard ISO/IEC 8802-11:1999(E) ANSI/IEEE Std 802.11, 1999 Edition, Part 11: Wireless LAN Medium Access Control (MAC) and Physical Layer (PHY) Specifications, and so on.

Networking conforming to the IEEE 802.11 standard is based on the concept of BSS (Basic Service Set). There are two types of BSS, wherein one is BSS defined in an infrastructure mode in which the system has a master control station such as an access point (AP) and the other is IBSS (Independent BSS) defined in an ad hoc mode in which the system is composed of multiple mobile terminals only (Mobile Terminal: MT). For communication in the ad hoc mode, it is known that communication is performed in the CSMA (Carrier Sense Multiple Access) mode using the RTS/CTS procedure. This processing is employed also by the IEEE 802.11 standard described above.

The following describes an example of the RTS/CTS procedure operation with reference to FIGS. 12A and 12B. FIGS. 12A and 12B are diagrams showing the conventional access control procedure executed by exchanging the RTS/CTS signals. As shown in FIG. 12A, the transmission side communication apparatus transmits the RTS signal before transmitting data and, upon receiving the CTS signal from the reception side communication apparatus shown in FIG. 12B, can start transmitting data.

In addition, the ACK signal, an acknowledgement signal indicating that data is received correctly, is usually returned from the reception side communication apparatus immediately after the data transmission is terminated, as shown in FIG. 12B. By transmitting and receiving the RTS signal and the CTS signal before starting data transmission in this way, communication can be performed while confirming if data can be transmitted through the wireless transmission line.

The Patent publication 1 discloses an example in which the RTS signal and the CTS signal are transmitted and received for performing wireless communication access control.

[Patent Publication 1]
Japanese Laid-Open Patent JPH8-37528.

However, even when the RTS signal and the CTS signal are transmitted and received before the data is transmitted through an ad hoc network, the data transmission sometimes fails if there is a so-called hidden terminal apparatus. FIGS. 13A to 13C show an example of a collision that is caused when the conventional RTS/CTS signal exchange is used to perform the access control. When the RTS signal is transmitted from the transmission side communication apparatus, the reception side communication apparatus returns the CTS signal in response to the RTS signal and, immediately after that, receives data as shown in FIGS. 13A and 13B.

Now, assume that there is a so-called hidden terminal apparatus that can not directly communicate with the transmission side communication apparatus through a wireless communication line, but can directly communicate with the reception side communication apparatus, as shown in FIG. 13C. At this time, if the hidden terminal apparatus regularly transmits a beacon signal to notify its presence to some other communication apparatus in the network, there is a possibility that the transmission timing of the beacon signal coincides with the transmission timing of data transmission from the transmission side communication apparatus as shown in FIGS. 13A to 13C. The hidden terminal apparatus is able to temporarily stop the transmission of the beacon signal if the hidden terminal apparatus can receive the RTS signal from the transmission side communication apparatus. However, because the hidden terminal apparatus in this example cannot receive the RTS signal from the transmission side communication apparatus, there exits a problem that cannot be solved.

One of the solutions of this problem is that, if there is a possibility of a collision between the reception of data and the reception of the beacon signal, it is thought that the reception side communication apparatus does not return the CTS signal to prevent the data transmission from being started. That is, the transmission side communication apparatus transmits the RTS signal prior to the transmission of data, for example, as shown in FIG. 14A. In this case, the reception side communication apparatus that receives the RTS signal does not return the CTS signal but enters the waiting state as shown in FIG. 14B (The broken line indicates the timing at which the CTS signal is to be transmitted). Although this method prevents the transmission side communication apparatus from transmitting data, the transmission side communication apparatus transmits the RTS signal again because it has a request to transmit data. However, there is a higher possibility of a collision between the transmission of the RTS signal and the transmission of the beacon signal transmitted from the hidden terminal apparatus shown in FIG. 14C. This collision between the RTS signal and the beacon signal prevents the reception side communication apparatus from correctly identifying the RTS signal, further delaying the chance for the data communication.

To solve this problem, the patent publication 1 described above discloses a technology that, if there is a possibility that the reception side communication apparatus receives the RTS signal but cannot receive data that will be transmitted following the RTS signal, the reception side communication apparatus returns the cancel signal instead of the CTS signal to cancel the data transmission at that time. The cancel signal disclosed in the patent publication 1 may also be used to return the cancel signal to cancel the RTS signal, for example, when the time at which the hidden terminal apparatus transmit the beacon signal is known.

However, because the transmission side communication apparatus that receives the cancel signal has data to be transmitted to the opponent, the transmission side communication apparatus must transmit the RTS signal again after a predetermined time to retry the communication. FIGS. 15A to 15C are diagrams showing an example of the above case. For example, the transmission side communication apparatus transmits the RTS signal before the data transmission as shown in FIG. 15A. In this case, the reception side communication apparatus returns the cancel signal in response to the RTS signal as shown in FIG. 15B. Then, after a predetermine time, the transmission side communication apparatus transmits the RTS signal again. However, if the hidden terminal apparatus starts the transmission of the RTS signal or data to some other terminal as shown in FIG. 15C, the retransmission of the RTS signal from the transmission side communication apparatus may collide with the transmission of the RTS signal or data from the hidden terminal apparatus.

As described above, the collision with the transmission from a hidden terminal apparatus is not avoided sufficiently and simply by delaying the transmission. Therefore, it is hard to say that the collision avoiding processing is carried out very efficiently.

SUMMARY OF THE INVENTION

The present invention seeks to solve the problems described above. There is a need for minimizing the collision of data transmitted via an ad hoc network in which a communication system, such as a wireless LAN system, is managed without a master control station.

According to the present invention, a communication station in the network estimates the timing at which one of communication stations transmit a signal and, when a communication start request is received from the one of the communication station, the communication station adds time information generated based on the length of time up to the estimated time, to a response for the communication start request.

When the reception side communication station knows in advance that the transmission line is going to be occupied by a transmission from other communication stations, the reception side communication station is able to transmit data at a certain timing while avoiding the occupation time.

The present invention therefore provides a communication system that prevents a collision between a transmission signal from a hidden terminal apparatus and a data signal in an ad hoc network where there is not any control communication apparatus.

In this case, each wireless communication apparatus identifies a predetermined signal which is regularly received by the communication apparatus, and estimates the time at which the regularly received signal will be received next. This estimation processing efficiently avoids a collision when there is a signal that is regularly received. For example, when the beacon signal is regularly received to allow other communication apparatuses in the network to identify the station from which the beacon signal is transmitted, a collision can be efficiently avoided.

If there is no reception permissible time as a result of the estimation processing, information indicating that there is no reception permissible time is added to a response to a communication start request. Transmitting this response allows the transmission requesting apparatus to take an appropriate action for avoiding a collision.

In addition, the reception permissible time estimated by the estimation processing is not long enough, the time information indicating the time required for the regularly received predetermined signal to be received next is added to the response to the communication start request. Transmitting this response allows the transmission requesting apparatus to retransmit the communication start request after the reception of the regularly received signal is completed while avoiding a signal collision more efficiently.

BRIEF DESCRIPTION OF THE DRAWINGS

In the accompanying drawings:

FIG. 3 is a diagram showing an example of the packet configuration of the Request To Send signal (RTS signal) in one embodiment of the present invention;

FIG. 4 is a diagram showing an example of the packet configuration of the Clear To Send signal (CTS signal) in one embodiment of the present invention;

FIG. 7 is a flowchart showing an example of the operation of the wireless communication apparatus in one embodiment of the present invention;

FIG. 8 is a diagram showing an example of the transmission frame period in one embodiment of the present invention;

FIGS. 9A to 9C are diagrams showing an example of collision avoidance (example 1) in one embodiment of the present invention;

FIGS. 10A to 10C are diagrams showing an example of collision avoidance (example 2) in one embodiment of the present invention;

FIGS. 11A to 11D are diagrams showing an example of collision avoidance (example 3) in one embodiment of the present invention;

FIGS. 12A and 12B are diagrams showing an example of a communication sequence executed by the conventional RTS/CTS signal exchange;

FIGS. 13A to 13C are diagrams showing an example of a collision caused by the conventional RTS/CTS signal exchange;

FIGS. 14A to 14C are diagrams showing an example of a collision caused when the conventional CTS signal is not returned; and FIGS. 15A to 15C are diagrams showing an example of a collision caused when the conventional cancel signal is returned.

DETAILED DESCRIPTION OF THE PREFERRED EMBODIMENT

An embodiment of the present invention will be described below with reference to FIGS. 1 to 11. This embodiment assumes a wireless communication link, and a network of multiple apparatuses that communicate via a single transmission medium (that is, the link is not separated into multiple frequency channels) is established. However, it should be noted that the embodiment is applicable also to an environment where multiple frequency channels are used as the transmission medium. This embodiment also assumes a store-and-forward communication traffic in which information is transferred in units of packets. The network used in this embodiment is an ad hoc network, described in the description of the related art, where there is not any control station that integrally manages the communication stations in the network.

Figure 1:
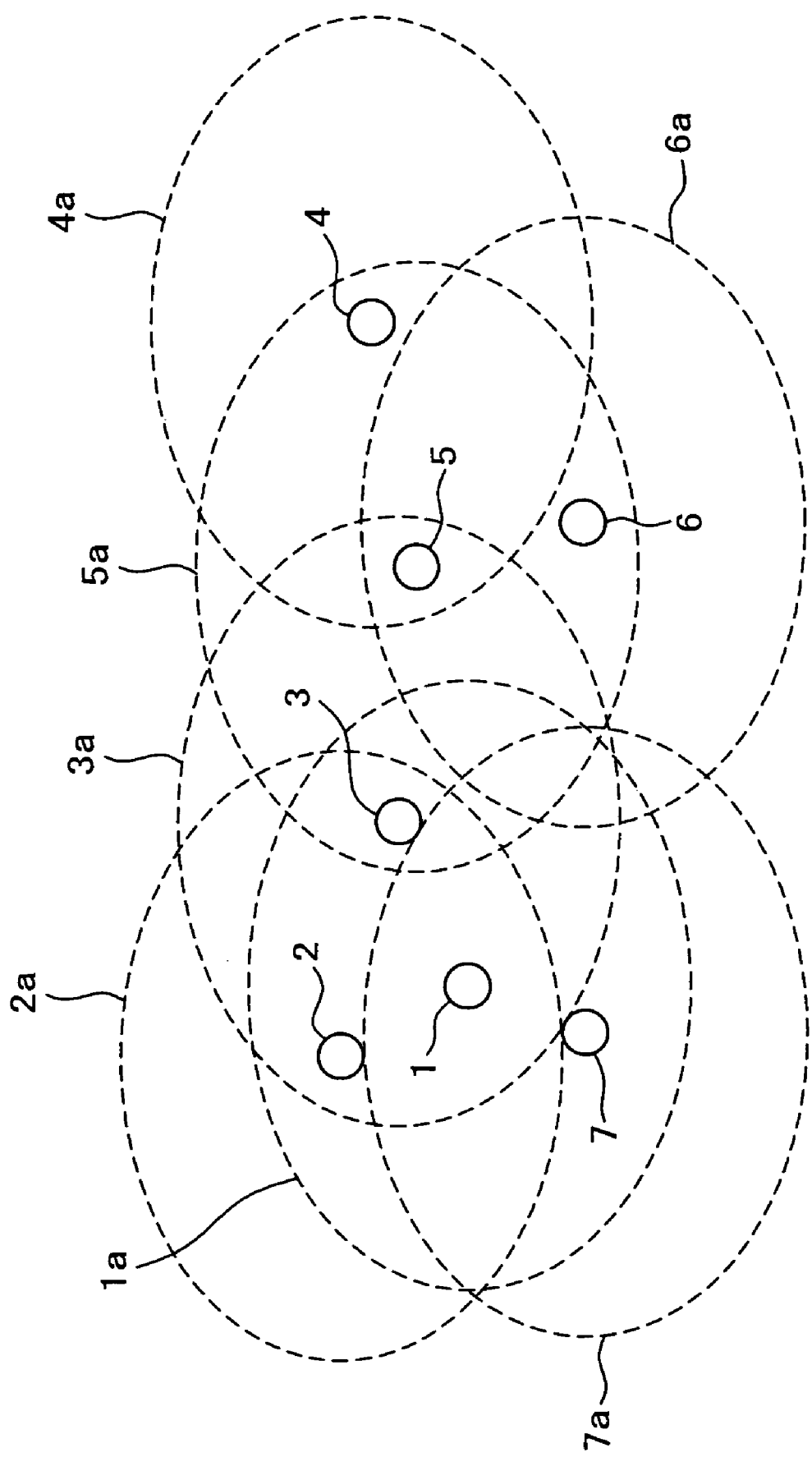
FIG. 1 is a diagram showing an example of the configuration of a wireless network in one embodiment of the present invention.

FIG. 1 shows an example of the arrangement of communication apparatuses (communication stations) that form a wireless communication system in this embodiment. This figure shows seven communication apparatuses, 1, 2, . . . , 7, distributed in the same space.

In FIG. 1, the communication ranges 1a, 2a, . . ., 7a of communication apparatuses 1, 2, . . . , 7 are indicated by broken lines. The communication range is defined as a range in which the communication apparatus can communicate with other communication apparatuses in the range and in which a signal transmitted from the communication apparatus interferes with other signals. That is, The communication apparatus 1 is in a range in which it can communicate with the neighboring communication apparatuses 2, 3, and 7.

The communication apparatus 2 is in a range in which it can communicate with the neighboring communication apparatuses 1 and 3.

The communication apparatus 3 is in a range in which it can communicate with the neighboring communication apparatuses 1, 2, and 5.

The communication apparatus 4 is in a range in which it can communicate with the neighboring communication apparatus 5.

The communication apparatus 5 is in a range in which it can communicate with the neighboring communication apparatuses 3, 4, and 6.

The communication apparatus 6 is in a range in which it can communicate with the neighboring communication apparatus 5.

The communication apparatus 7 is in a range in which it can communicate with the neighboring communication apparatus 1.

In this embodiment, the communication apparatuses use one wireless transmission line in a time-division manner to perform access control processing while considering an effect on other neighboring communication apparatuses.

Figure 2:
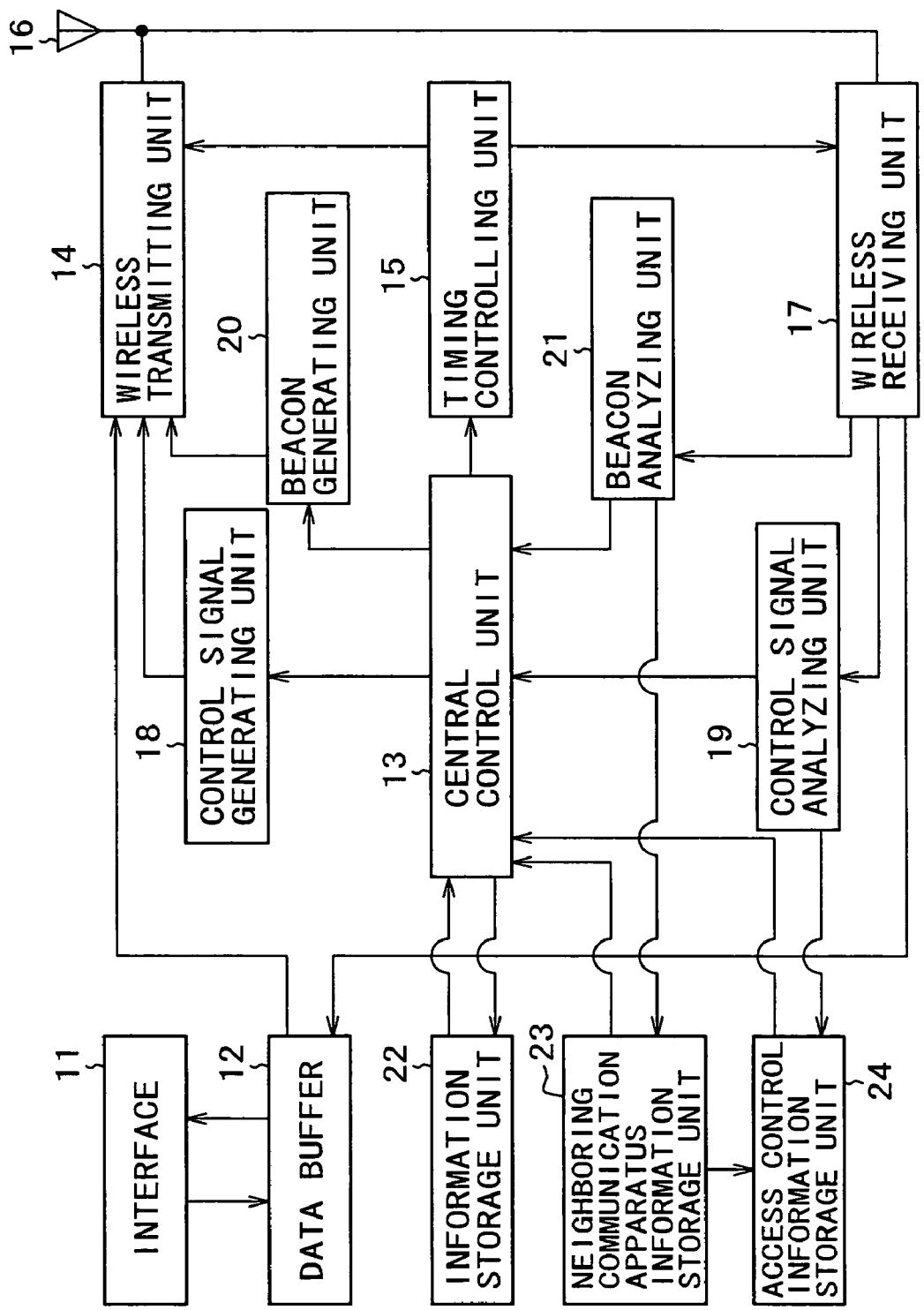
FIG. 2 is a block diagram showing an example of the configuration of a wireless communication apparatus in one embodiment of the present invention.

FIG. 2 is a block diagram showing an example of the configuration of a wireless communication apparatus that constitutes the communication station applicable to the system in this embodiment. This wireless communication apparatus comprises an interface 11 for exchanging various types of information with an apparatus (not shown) connected to the wireless communication apparatus, and a data buffer 12 in which data transmitted from the connected apparatus via the interface 11 and data received via the wireless transmission line are temporarily stored.

The wireless communication apparatus further comprises a central control unit 13 that manages a sequence of information transmission/reception processing in this wireless communication apparatus and controls access to the transmission line in an integrated fashion, and a wireless transmitting unit 14 and a wireless receiver 17 that are processors for executing transmission and reception under control the central control unit 13. For example, the wireless transmitting unit 14 modulates data, stored in the data buffer 12, into ultra wideband signals (UWB signals) and the wireless receiver 17 demodulates ultra wideband signals and supplies the demodulated data to the data buffer 12. An antenna 16 is connected to the wireless transmitting unit 14 and the wireless receiver 17 for transmission and reception of wireless signals. Separate antennas may also be used for transmission and reception, or a plurality of antennas may also be provided for diversity reception.

A timing control unit 15 controls the transmission timing of the wireless transmitting unit 14 and the reception timing of the wireless receiver 17. The wireless communication apparatus in this embodiment further comprises a control signal generating unit 18 for generating information such as the Request To Send (RTS) signal and the Clear To Send (CTS) signal before the transmission of data under control of the central control unit 13, and causes the wireless transmitting unit 14 to transmit these control signals generated by the control signal generating unit 18. The wireless communication apparatus further comprises a beacon generating unit 20 for generating a beacon signal which is regularly exchanged with other neighboring wireless communication apparatuses under control of the central control unit 13, and causes the wireless transmitting unit 14 to transmit the beacon signal generated by the beacon generating unit 20. The timing control unit 15 also controls the transmission timing of those control signals and the beacon signal.

a control signal analyzing unit 19 that analyzes the control information, such as the Request to Sent (RTS) signal and the Clear To Send (CTS) signal, transmitted from the neighboring wireless communication apparatuses and a beacon analyzing unit 21 that analyzes the beacon signals received by the wireless receiver 17 for analyzing the neighboring wireless communication apparatuses are connected to the wireless receiver 17, and the wireless receiver 17 transmits the analysis result of those analyzers to the central control unit 13.

Three storage units 22, 23, 24 are connected to the central control unit 13, in which the information storage unit 22 stores the addresses of other wireless communication apparatuses in the network and the execution procedure instructions for a sequence of access control operations; the neighboring communication apparatus information storage unit 23 stores beacon transmission position information on the neighboring wireless communication apparatuses existing near to the wireless communication apparatus; and the access control information storage unit 24 temporarily stores the parameters used for access control in this embodiment. The central control unit 13 is able to comprehend the stored information.

Although the UWB communication system is used as an example of the wireless communication system in the description in this specification, this embodiment can also be used for other various communication systems applicable to a wireless LAN and suitable for a relatively short distance communication. More specifically, systems other than the UWB systems are the OFDM (Orthogonal Frequency Division Multiplex) communication system and the CDMA (Code Division Multiple Access) communication system.

Next, an example of the configuration of a packet transmitted by the wireless communication apparatuses in the network in this embodiment will be described with reference to FIGS. 3 to 6.

First, FIG. 3 shows an example of the packet configuration of the Request To Send (RTS) signal. A packet of the Request To Send signal transmitted by a communication apparatus that is going to start data transmission includes the following common header information in this order: the type indicating that the packet is a Request To Send (RTS) signal packet, the data length indicating the length of the packet, the Rx address indicating the address of the reception side communication apparatus, and the Tx address indicating the address of the transmission side communication apparatus (that is, the address of itself). The packet further includes additional information as necessary, such as the parameter indicating the total amount of data (that is, the amount of data to be transmitted) stored in the data buffer 12 and time information that may be transmitted. The packet is terminated by the code (CRC) used for checking the information for an error.

FIG. 4 shows an example of the packet configuration of the Clear To Send (CTS) signal. A packet of the Clear To Send signal, used by a communication apparatus in response to the received Request To Send signal, includes the following common header information in this order: the type indicating that the packet is a Clear To Send (CTS) signal packet, the data length indicating the length of the packet, the Rx address indicating the address of the reception side communication apparatus, and the Tx address indicating the address of the transmission side communication apparatus (that is, the address of itself). The packet further includes additional information as necessary, such as the parameter indicating a reception permissible time and the parameter indicating a next usable time. The packet is terminated by the code (CRC) used for checking the information for an error.

Figure 5:
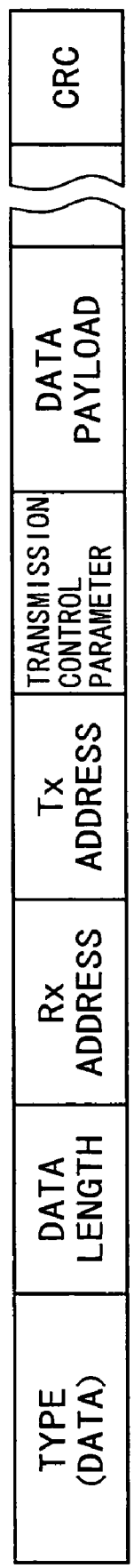
FIG. 5 is a diagram showing an example of the packet configuration of a data signal in one embodiment of the present invention.

FIG. 5 shows an example of the configuration of a packet used to transmit actual data signals to be transmitted (so-called a payload). A data packet includes the following common header information in this order: the type indicating that the packet contains data, the data length indicating the length of the packet, the Rx address indicating the address of the reception side communication apparatus, and the Tx address indicating the address of the transmission side communication apparatus (that is, the address of itself). The packet further includes the transmission control parameter, such as a sequence number, and the actual data payload. The packet is terminated by the code (CRC) used for checking the information for an error.

Figure 6:
FIG. 6 is a diagram showing an example of the packet configuration of an acknowledgement signal (ACK signal) in one embodiment of the present invention.

FIG. 6 shows an example of the packet configuration of an acknowledgement (reception) (ACK) signal that is returned when data is received correctly. A packet of the acknowledgement signal includes the following common header information in this order: the type indicating that the packet is an acknowledgement (ACK) signal packet, the data length indicating the length of the packet, the Rx address indicating the address of the reception side communication apparatus, and the Tx address indicating the address of the transmission side communication apparatus (that is, the address of itself). The packet further includes the parameters for ACK information or retransmission request information as necessary. The packet is terminated by the code (CRC) used for checking the information for an error.

In addition to those packets, the wireless communication apparatus transmits and receives another signal called a beacon signal not shown. The beacon signal, a packet generated by the beacon generating unit 20 in the communication apparatus, contains header information similar to that in the packets shown in FIGS. 3 to 6 as well as information indicating that the packet is a beacon and information to be notified by the beacon. Basically, the wireless communication apparatuses in the network regularly transmit this beacon signal.

That is, each wireless communication apparatus in an ad hoc network in this embodiment performs communication using the frame configuration shown in FIG. 8. This frame configuration is established by the transmission of the beacon signal from the station, and the same period but a different offset timing are set at each of wireless communication apparatuses in the network. That is, setting the beacon transmission position, which differs among wireless communication apparatuses, constitutes an autonomous type ad hoc wireless network.

In this case, the beacon signal transmission time t1 is followed immediately by the signal reception area ta, as shown in FIG. 8, during which other wireless communication apparatuses transmit and receive signals to or from that wireless communication apparatus. The reception area may also be set by each wireless communication apparatus to increase the reception time according to the required amount.

Next, an example of communication operation processing under control of the central control unit 13 of each wireless communication apparatus in this embodiment in an ad hoc network will be described with reference to the flowchart in FIG. 7. First, the central control unit 13 checks if the interface 11 receives a data transmission request (step S1) and, if it receives the request, the central control unit 13 generates Request To Send information (RTS signal) (step S2) and checks if the transmission line access right is acquired. For example, when the transmission line is not used for a predetermined time, the central control unit 13 finds that the wireless communication apparatus can transmit data (step S3) and then transmits the previously generated RTS signal (step S4), sets the wait time of the Clear To Send (CTS) signal, and passes control back to step S1.

If it is found that no transmission request is received in step S1, the central control unit 13 checks if the wireless receiver 17 receives a signal via wireless communication (step S6). If it is found that the wireless receiver 17 receives a signal via wireless communication, the central control unit 13 performs the reception processing described below according to the received signal.

If the RTS signal is received (step S7), the central control unit 13 refers the neighboring communication apparatus information storage unit 23 and the access control information storage unit 24 to estimate the time at which the transmission of the beacon signal or other signals are started (step S8) generates the CTS information with the time information as the reception permissible time information (Step S9), transmits the generated CTS signal (step S10), and returns control to step S1.

If the CTS signal is received (step S11), the central control unit 13 acquires the reception permissible time information of the opponent included in the CTS signal (step S12) and generates the amount of data that can be transmitted until the time indicated by the reception permissible time information (step S13). If the ACK signal is required to be returned immediately after the data transmission, it is also possible to generate the amount of transmission data that can be transmitted until the time from which the time required to return the ACK signal is subtracted. After that, the central control unit 13 transmits the data signal packet (step S14) and returns control to step S1.

If the data signal packet is received (step S15) the central control unit 13 collects the data (step S16) and generates the acknowledgement (ACK) information of the data (step S17). If the ACK signal is required to be returned immediately after the data reception, the ACK information generated in step S17 is returned (step S18). Alternatively, if there is data not yet received, it is also possible to return the ACK information indicating a retransmission request.

If all of the data are received normally (step S19), the data is transferred to the interface 11 (step S20) and control is passed back to step S1. If all of the data are not yet received normally, control is passed from step S19 directly to step S1.

If the ACK signal packet is received (step S21) the central control unit 13 refers the parameter included in the ACK information and, if a retransmission request is included (step S22), generates retransmission data (step S23), transmits the retransmission data (step S24), and then passes control back to step S1. If the ACK signal does not include the retransmission request, the transmission of data is completed, a sequence of processing is finished, and control is passed back to step S1.

In addition, if it is found in step S6 that the wireless receiver 17 does not receive a signal via wireless communication, the central control unit 13 checks if the wait time is set by the CTS signal (step S25). If the wait time is set, the central control unit 13 checks if the wait time elapses (step S26) and, if the wait time elapses, passes control to step S3, acquires the access right, and tries to transmit the RTS signal again. If the wait time is not set by the CTS signal or if the wait time does not elapse, control is passed back to step S1.

Next, an example of transmission processing when the communication processing described above is performed. FIGS. 9A to 9C show an example of collision avoidance by returning the CTS signal in this embodiment. Assume that the transmission side communication apparatus has a request to send data, and transmits the RTS signal to the reception side communication apparatus as shown in FIG. 9A. In response to this RTS signal, the reception side communication apparatus returns the CTS signal as shown in FIG. 9B. In this example, assume that there is a hidden terminal apparatus that transmits a beacon signal that can be received by the reception side communication apparatus as shown in FIG. 9C (The transmission side communication apparatus cannot receive the beacon signal).

In this case, the reception side communication apparatus can estimate the time at which the next beacon signal is received because the beacon signal is basically transmitted periodically as described above. Therefore, the reception side communication apparatus refers the time at which the reception of the next beacon signal is started and generates the CTS signal which includes the communication permissible time (reception permissible time) as the parameter as shown in FIG. 4.

For a transmission frame including a plurality of beacon signals, the reception side communication apparatus refers, for example, the reception time of the beacon signal that arrive first. If it is possible to communicate all amount of data indicated by the RTS signal until the next beacon signal is received, the communication permissible time may be a message simply indicating that data can be received. Alternatively, the time at which the amount of data indicated by the RTS signal can be communicated may be used as the communication permissible time.

The transmission side communication apparatus, which receives the CTS signal including the data described above, calculates the time usable for communication from the communication permissible time as shown in FIGS. 9A to 9C, estimates the amount of transmittable data, and transmits a data packet within the period indicated by the broken line so that the data does not collide with the beacon signal of the hidden terminal as shown in FIG. 9A.

The example in FIGS. 9A to 9C assumes that the ACK signal is required to be returned immediately after the data transmission. Thus, in this example, the time required by the reception side communication apparatus to return the ACK signal is calculated back, the data transmission amount is adjusted (reduced) accordingly, and the data packet transmission time is set. If the ACK signal is not required to be returned immediately after the data transmission, the data can be communicated using the part indicated by the broken line as well as by the chain line in FIG. 9A, that is, the data can be communicated until the time immediately before the communication permissible time transmitted via the CTS signal.

The communication processing shown in FIGS. 9A to 9C allows the reception side communication apparatus to minimize a collision between the reception of data and the reception of the beacon even when there is a communication terminal hidden from the transmission side communication apparatus, thus efficiently avoiding a reception error that may be caused by a reception collision.

In the example in FIGS. 9A to 9C, the communication permissible time is long to some degree. However, in some cases, the reception side communication apparatus has no (or a very short) reception permissible time. In such a case, it is possible for the CTS signal to indicate that there is no reception permissible time as shown in FIG. 10 (In this example, the CTS signal indicates that the reception permissible time is 0)

In this case, the transmission side communication apparatus has a data transmission request, and transmits the RTS signal to the reception side communication apparatus, for example, as shown in FIG. 10A. In response to the RTS signal, the reception side communication apparatus transmits the CTS signal with the reception permissible time of 0 as the parameter as shown in FIG. 10B. Upon receiving the CTS signal, the transmission side communication apparatus finds that communication cannot be performed now and waits without starting the data transmission. Therefore, even if the beacon is transmitted from the hidden terminal apparatus immediately after the transmission of the CTS signal, the transmission of the beacon and the transmission of data do not collide as shown in FIG. 10C and thus the collision can be avoided efficiently.

When the CTS signal indicates that there is no reception permissible time as shown in FIGS. 10A to 10C, it is also possible to add the time, from the completion of the reception of the beacon signal to the reception of the next beacon signal, to the CTS signal. That is, the next usable time information area is provided in the CTS signal, for example, as shown in FIG. 4. When the reception permissible time of 0 is added to the CTS signal, the next usable time is set in that area to indicate the reception permissible time of the next beacon signal. This configuration allows the transmission side communication apparatus that receives the CTS signal to find a period, from the time the beacon signal is transmitted to the time data can be transmitted, and to transmit a data packet in that period.

In this case, when the signal length parameter and the occupation time parameter of the signal transmitted from the hidden terminal apparatus are identified, it is possible to avoid a collision more actively by notifying the signal length as well to the transmission side communication apparatus.

FIGS. 11A to 11D show another example of collision avoidance by returning the CTS signal. In this example, the transmission side communication apparatus, which has a data transmission request, transmits the RTS signal to the reception side communication apparatus as shown in FIG. 11A. After that, the reception side communication apparatus returns the CTS signal to notify the transmission side communication apparatus about the communication permissible time as shown in FIG. 11B. At this time, assume that there is at least one hidden terminal apparatus whose signal can be received by the reception side communication apparatus but not by the transmission side communication apparatus as shown in FIG. 11C and that there is at least one another hidden terminal apparatus that can directly communicate with the hidden terminal apparatus described above as shown in FIG. 11D. Assume that even the reception side communication apparatus cannot receive the signal from the hidden terminal apparatus shown in FIG. 11D.

Assume that, when the reception side communication apparatus receives the RTS signal in this situation, the two hidden terminal apparatuses already starts the transmission of a data packet after transmitting and receiving the RTS signal and the CTS signal between them as shown in FIGS. 11C and 11D.

In this case, the reception side communication apparatus receives the CTS signal, transmitted from the hidden terminal apparatus shown in FIG. 11C to the other hidden terminal apparatus, and checks the reception permissible time included in the CTS signal. The reception side communication apparatus estimates the time at which the ACK signal is transmitted from that hidden terminal apparatus, refers the estimated time information, generates the CTS signal that includes the communication permissible time as the parameter, and transmits the generated CTS signal to the transmission side communication apparatus.

This allows the transmission side communication apparatus, which receives the CTS signal, to calculate the time usable for communication from the communication permissible time, to estimate the amount of transmittable data, and to transmit the data so that the data does not collide with the beacon signal transmitted from the above-described hidden terminal apparatus. Again, if the ACK signal is required to be returned immediately after the data transmission, the time required by the reception side communication apparatus to return the ACK signal is calculated back, the data transmission amount is adjusted (reduced) accordingly, and the data included in the part indicated by the broken line in FIG. 11A can be transmitted. If the ACK signal is not required to be returned immediately after the data transmission, the data can be communicated using the part indicated by the broken line as well as by the chain line, that is, the data can be communicated until the time immediately before the transmitted communication permissible time.

In the examples described above, the time usable for communication is identified from the transmission of the beacon signal or from the CTS signal transmitted from the hidden terminal apparatus. Any other time information in the received signal, if identified by the reception side communication apparatus as a time usable for communication, may also be used.

Although the communication apparatus in this embodiment has a configuration dedicated to the transmission and reception as shown in FIG. 2, another configuration is also possible in which a board or a card, which executes communication processing corresponding to the transmitter or the receiver of the embodiment, is installed on a personal computer that executes various types of data processing so that the computer can execute the communication control processing and, at the same time, the software for executing the communication control processing is installed on the personal computer. The program installed on the personal computer or the data processing device may be distributed on a recording (storage) medium such as an optical disc or a memory card or distributed via communication means such as the Internet.

What is claimed is:

1. A method of avoiding data transmission collisions in a wireless network due to a beacon signal periodically transmitted from a hidden terminal, comprising the steps of:
    sending a request-to-send signal from a transmitting apparatus to a receiving apparatus;
    estimating a reception permissible time in the receiving apparatus based on an estimated time the beacon signal will next be transmitted from the hidden terminal, wherein the beacon signal can be received by the receiving apparatus and cannot be received by the transmitting apparatus;
    sending a clear-to-send signal from the receiving apparatus to the transmitting apparatus in response to the request to send signal, wherein the clear-to-send signal includes the reception permissible time.

2. The method according to claim 1, wherein if the reception permissible time is 0, the clear-to-send signal includes a next usable time based on a period of transmission of the beacon signal.

3. The method according to claim 1, further comprising a step of transmitting data from the transmitting apparatus to the receiving apparatus in the reception permissible time.

4. A wireless network communication system for avoiding data transmission collisions due to a beacon signal periodically transmitted from a hidden terminal, comprising:
    a transmitting apparatus for transmitting data to a receiving apparatus, the transmitting apparatus sends a request-to-send signal to the receiving apparatus;
    the receiving apparatus estimates a reception permissible time based on an estimated time the beacon signal will next be transmitted from the hidden terminal, wherein the beacon signal can be received by the receiving apparatus and cannot be received by the transmitting apparatus; and
    the receiving apparatus sends a clear-to-send signal from to the transmitting apparatus in response to the request to send signal, wherein the clear-to-send signal includes the reception permissible time.

5. The method according to claim 4, wherein if the reception permissible time is 0, the clear-to-send signal includes a next usable time based on a period of transmission of the beacon signal.

6. The method according to claim 4, wherein comprising the transmitting apparatus transmits data to the receiving apparatus in the reception permissible time.

* * * * *